(12) United States Patent
Floratou et al.

(10) Patent No.: US 10,642,741 B2
(45) Date of Patent: May 5, 2020

(54) ACCESSING TABLES WITH HETEROGENEOUS PARTITIONS

(71) Applicant: International Business Machines Corporation, Armonk, NY (US)

(72) Inventors: Avrilia Floratou, San Jose, CA (US); Fatma Ozcan, San Jose, CA (US); Mir H. Pirahesh, San Jose, CA (US); Navneet S. Potti, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/425,808

(22) Filed: Feb. 6, 2017

(65) Prior Publication Data
US 2018/0225215 A1 Aug. 9, 2018

(51) Int. Cl.
*G06F 12/0846* (2016.01)

(52) U.S. Cl.
CPC .. *G06F 12/0848* (2013.01); *G06F 2212/1041* (2013.01); *G06F 2212/282* (2013.01)

(58) Field of Classification Search
CPC ................. G06F 12/0848; G06F 2212/282
See application file for complete search history.

(56) References Cited

U.S. PATENT DOCUMENTS

| | | | |
|---|---|---|---|
| 6,349,310 B1 | 2/2002 | Klein et al. | |
| 7,080,072 B1 | 7/2006 | Sinclair | |
| 8,099,391 B1 * | 1/2012 | Monckton | G06F 11/1451 707/647 |
| 2005/0177777 A1 * | 8/2005 | Seaburg | G06F 11/1464 714/42 |
| 2006/0271754 A1 * | 11/2006 | Shibayama | G06F 3/0608 711/165 |
| 2007/0208790 A1 * | 9/2007 | Reuter | G06F 12/0253 |
| 2008/0307178 A1 * | 12/2008 | Agombar | G06F 3/0605 711/162 |
| 2009/0249116 A1 * | 10/2009 | Bartfai | G06F 11/2066 714/6.12 |
| 2010/0161928 A1 * | 6/2010 | Sela | G06F 12/1441 711/163 |
| 2012/0284527 A1 * | 11/2012 | Nagpal | H04L 63/04 713/189 |
| 2013/0132371 A1 * | 5/2013 | Bharath | G06F 17/30463 707/719 |
| 2015/0302035 A1 | 10/2015 | Raghavan et al. | |
| 2017/0199666 A1 * | 7/2017 | Sundaram | G11C 7/1042 |

OTHER PUBLICATIONS

Chasseur et al., "Design and Evaluation of Storage Organizations for Read-Optimized Main Memory Databases," Proceedings of the VLDB Endowment, vol. 6, No. 13, 2013, pp. 1-12.

(Continued)

*Primary Examiner* — Larry T Mackall
(74) *Attorney, Agent, or Firm* — Zilka-Kotab, P.C.

(57) ABSTRACT

A computer-implemented method according to one embodiment includes receiving a request for data, locating the data at one or more partitions of a heterogeneously partitioned table, determining an access method associated with each of the one or more partitions, and requesting the data from the one or more partitions, utilizing the access method associated with each of the one or more partitions.

13 Claims, 9 Drawing Sheets

(56) References Cited

OTHER PUBLICATIONS

Hankins et al., "Data Morphing: An Adaptive, Cache-Conscious Storage Technique," Proceedings of the 29th VLDB Conference, 2003, pp. 1-12.
Jindal et al., "Trojan Data Layouts: Right Shoes for a Running Elephant," SOCCI'11, Oct. 27-28, 2011, pp. 1-14.
Grund et al., "HYRISE—A Main Memory Hybrid Storage Engine," Proceedings of the VLDB Endowment, vol. 4, No. 2, 2010, pp. 1-12.
Hogg et al., "Azure Storage Table Design Guide: Designing Scalable and Performant Tables," Nov. 28, 2016, pp. 1-834, Retrieved From https://docs.microsoft.com/en-us/azure/storage/storage-table-design-guide.
NIST Cloud Computing Program, NIST, Information Technology Laboratory, Nov. 15, 2010, Last Updated Nov. 13, 2013, pp. 1-2, Retrieved from http://www.nist.gov/itl/cloud/.
Mell et al., "The NIST Definition of Cloud Computing," Version 15, Oct. 7, 2009, pp. 1-2, Nov. 2010.
Mell et al. "The NIST Definition of Cloud Computing," NIST, Special Publication 800-145, Sep. 2011, pp. 1-7.

\* cited by examiner

ACCESSING TABLES WITH HETEROGENEOUS PARTITIONS

BACKGROUND

The present invention relates to data storage and retrieval, and more specifically, this invention relates to managing data stored at a variety of different locations utilizing a variety of different techniques.

Many current information systems store data at multiple different data storage systems utilizing a variety of different data formats. This data may also be moved between different storage systems at various points in time. For example, current acquired data may be stored at a first location and may later be moved to a second location for long-term storage as it becomes historical data.

However, current methods for obtaining data from these different storage systems have various drawbacks. For example, when data is stored in multiple different storage systems, queries for such data may need to identify each of the multiple storage systems. Drafters of such queries may also need to be aware of a current location of requested data in order to draft a correct query. Query compilers and optimizers also have trouble accommodating multiple different storage systems.

SUMMARY

A computer-implemented method according to one embodiment includes receiving a request for data, locating the data at one or more partitions of a heterogeneously partitioned table, determining an access method associated with each of the one or more partitions, and requesting the data from the one or more partitions, utilizing the access method associated with each of the one or more partitions.

According to another embodiment, a computer program product for accessing tables with heterogeneous partitions includes a computer readable storage medium having program instructions embodied therewith, wherein the computer readable storage medium is not a transitory signal per se, and where the program instructions are executable by a processor to cause the processor to perform a method comprising receiving a request for data, utilizing the processor, locating the data at one or more partitions of a heterogeneously partitioned table, utilizing the processor, determining an access method associated with each of the one or more partitions, utilizing the processor, and requesting, utilizing the processor, the data from the one or more partitions, utilizing the access method associated with each of the one or more partitions.

A system according to another embodiment includes a processor, and logic integrated with the processor, executable by the processor, or integrated with and executable by the processor, the logic being configured to receive a request for data, locate the data at one or more partitions of a heterogeneously partitioned table, determine an access method associated with each of the one or more partitions, and request the data from the one or more partitions, utilizing the access method associated with each of the one or more partitions.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for accessing tables with heterogeneous partitions. Various embodiments provide a method for requesting data from a variety of different locations, utilizing access methods specific to those locations.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for accessing tables with heterogeneous partitions.

In one general embodiment, a computer-implemented method includes receiving a request for data, locating the data at one or more partitions of a heterogeneously partitioned table, determining an access method associated with each of the one or more partitions, and requesting the data from the one or more partitions, utilizing the access method associated with each of the one or more partitions.

In another general embodiment, a computer program product for accessing tables with heterogeneous partitions includes a computer readable storage medium having program instructions embodied therewith, wherein the computer readable storage medium is not a transitory signal per se, and where the program instructions are executable by a processor to cause the processor to perform a method comprising receiving a request for data, utilizing the processor, locating the data at one or more partitions of a heterogeneously partitioned table, utilizing the processor, determining an access method associated with each of the one or more partitions, utilizing the processor, and requesting, utilizing the processor, the data from the one or more partitions, utilizing the access method associated with each of the one or more partitions.

In another general embodiment, a system includes a processor, and logic integrated with the processor, executable by the processor, or integrated with and executable by the processor, the logic being configured to receive a request for data, locate the data at one or more partitions of a heterogeneously partitioned table, determine an access method associated with each of the one or more partitions, and request the data from the one or more partitions, utilizing the access method associated with each of the one or more partitions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
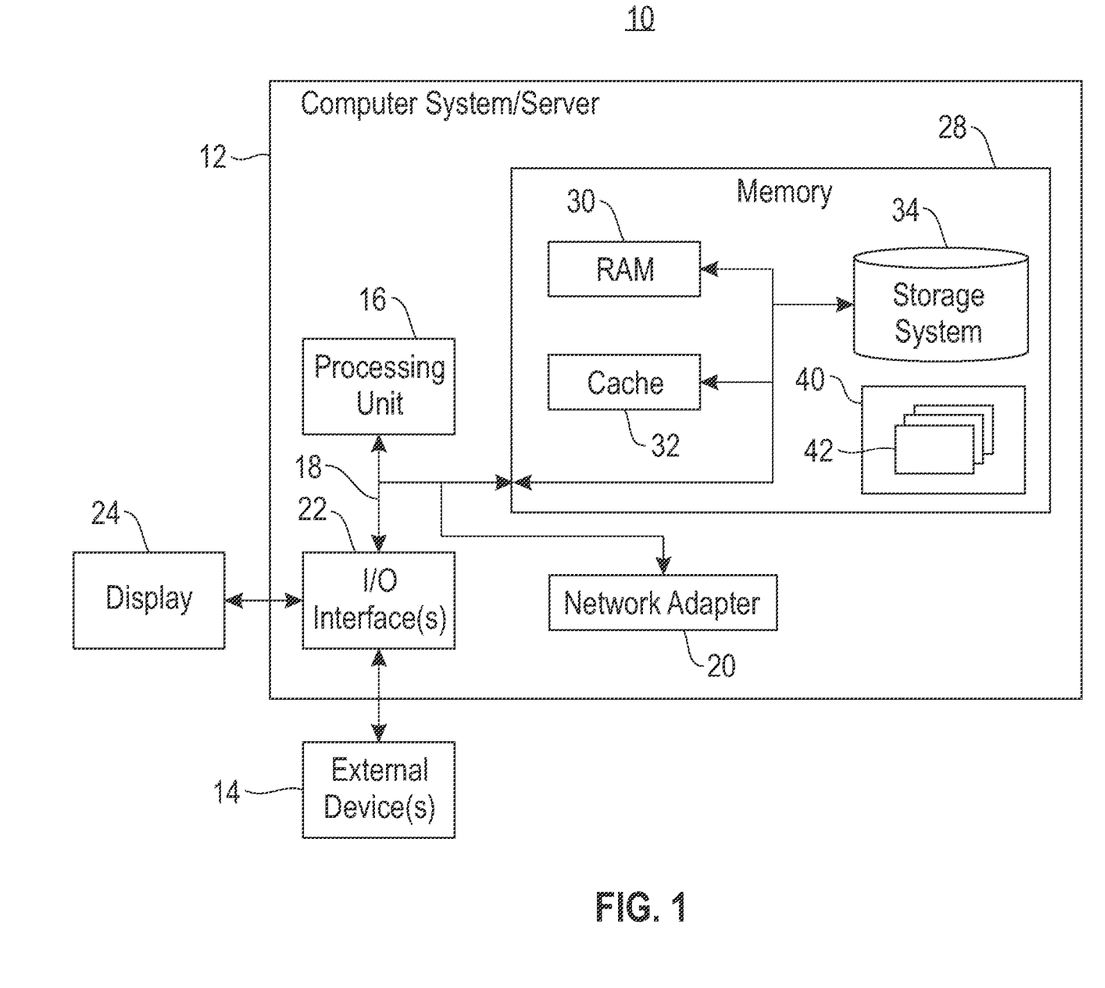
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
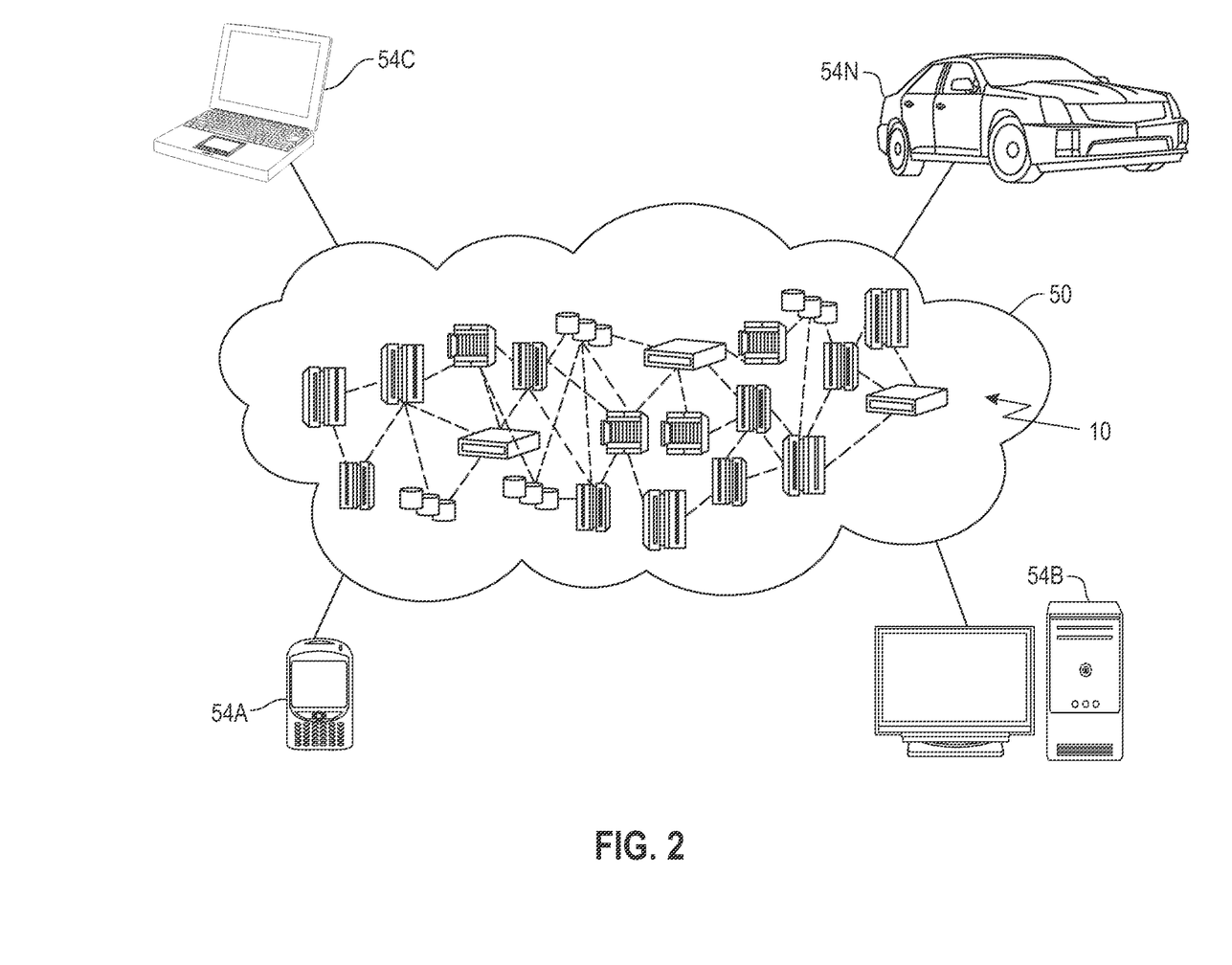
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
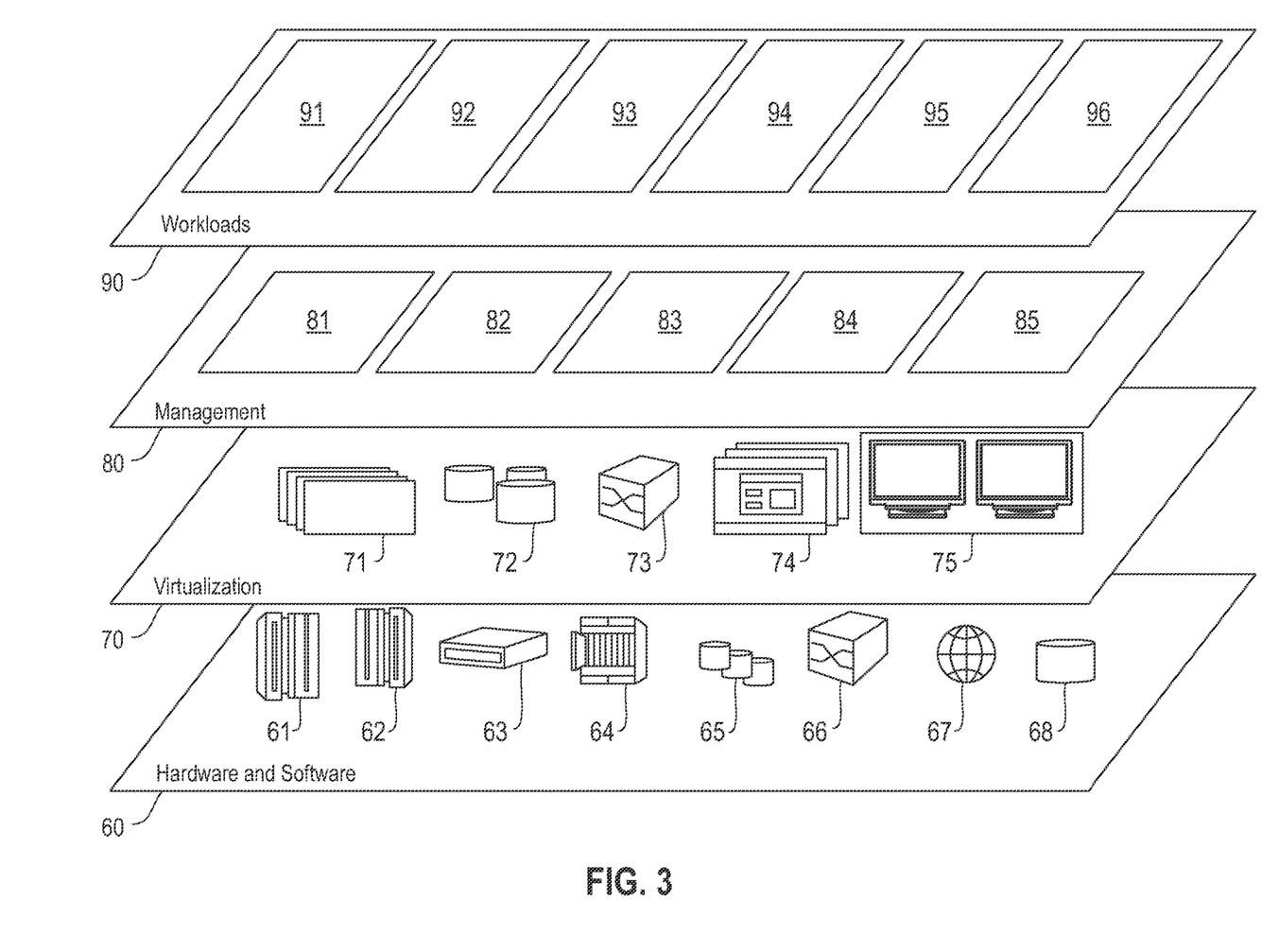
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage 96.

Figure 4:
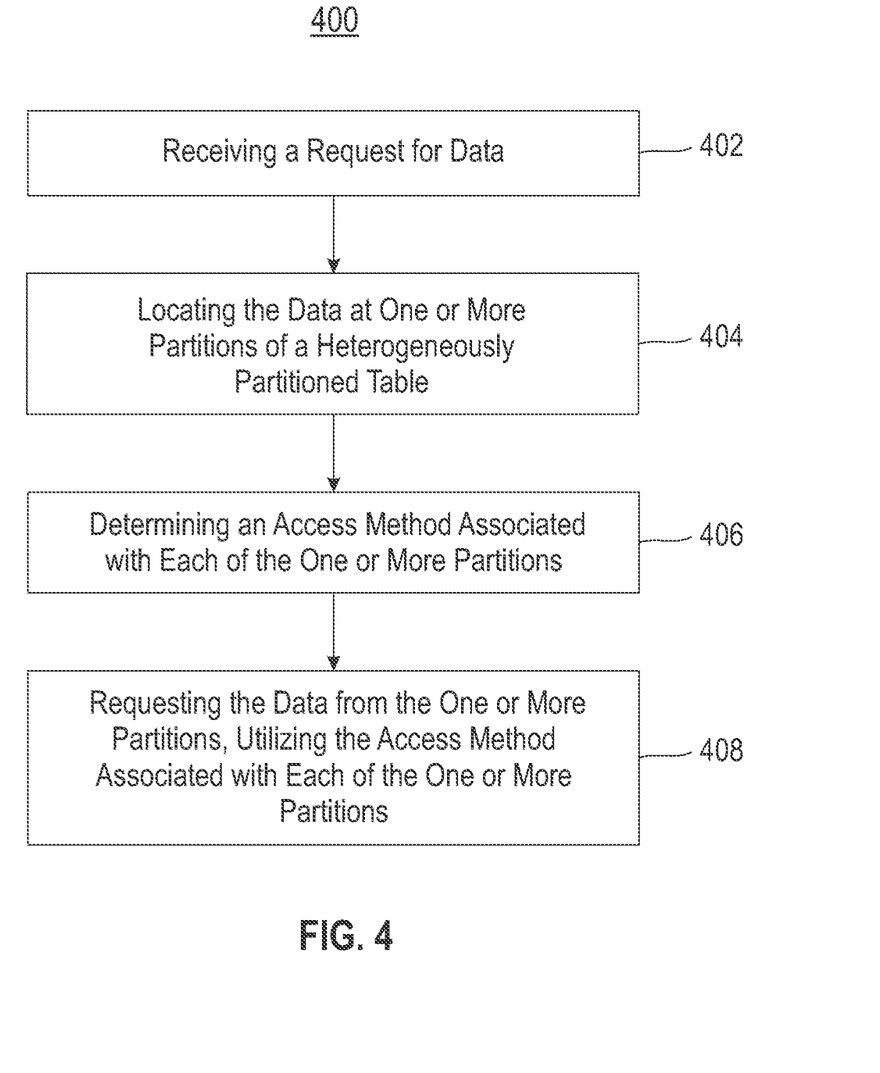
FIG. 4 illustrates a method for accessing tables with heterogeneous partitions, in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request for data is received. In one embodiment, the request may include a single query for the data that utilizes a single access method. For example, the request may include a query language query (e.g., a single structured query language query (SQL) query, etc.) for one or more heterogeneously partitioned tables. In another embodiment, the request may include a request to read the data. For example, the request may include a read-only request for the data. In yet another embodiment, the data may include any data capable of being digitally stored. For example, the data may include audio data, video data, picture data, application data, textual data, etc. In still another embodiment, the data may be stored in a combination of storage mediums (e.g., solid state drives (SSDs), hard disk drives (HDDs), etc.) and object-stores Additionally, in one embodiment, the query may be received by a query compiler of a system. For example, the query compiler may compile and optimize the query and may generate a query execution plan. The query compiler may then work with a scheduler of the system that assigns one or more partitions to workers (e.g., threads, processes, etc.), based on the query. In one example, a query compiler/optimizer may generates a query execution plan that accesses heterogeneous partitions, where each heterogeneous partition is called out in the plan. In another example, the optimizer may see a single table, and the scheduler at run-time may generate the access plans for each heterogeneous partition.

Further, as shown in FIG. 4, method 400 may proceed with operation 404, where the data is located at one or more partitions of a heterogeneously partitioned table. In one embodiment, the data may be located utilizing the scheduler of the system. In another embodiment, the heterogeneously partitioned table may include an abstract representation of a plurality of different data storage locations. For example, each partition within the heterogeneously partitioned table may represent one of a plurality of different data storage locations. In yet another embodiment, the data may be located at a single partition within the table, or the data may be distributed among a plurality of the partitions within the table.

Further still, in one embodiment, one storage location within the heterogeneously partitioned table may have a different storage format than another storage location within the heterogeneously partitioned table. For example, one storage location may utilize a column organized storage format (e.g., a columnar storage format such as Parquet®, etc.) to store data, and another storage location may utilize a row organized storage format (e.g, an optimized row columnar storage format, etc.) to store data.

Also, in one embodiment, one storage location within the heterogeneously partitioned table may be located in a different physical location than another storage location within the heterogeneously partitioned table. For example, one storage location may be distributed/cloud-based (e.g., an HDFS file system, etc.), another storage location may be enterprise-based (e.g., an enterprise data warehouse (EDW), an on-premises enterprise, etc.), etc.

In addition, in one embodiment, one storage location within the heterogeneously partitioned table may include a different type of hardware than another storage location within the heterogeneously partitioned table. For example, one storage location may include flash memory storage, another storage location may include hard disk drive storage, etc.

Furthermore, in one embodiment, the data may be transformed from one storage format to the other one at scheduled intervals, or on-demand. In another embodiment, the same data items may be present in multiple partitions, which may allow overlap between partitions. As a result, high and low watermarks may be tracked for each partition so that data ranges contained in each partition are known.

In another embodiment, during query processing, the query compiler may identify the unnecessary partitions (e.g., by performing partition elimination, etc.). For example, partitions that are not relevant or needed by the current query may be eliminated. The query processor may access only the remaining partitions, and the scheduler may insert additional predicates, if necessary, to avoid duplicate counting. In yet another embodiment, the data may currently be in the process of being transferred from one partition to another partition within the heterogeneously partitioned table. During this transition, a location of data being transferred may be tracked. For example, one or more timestamps may be identified for data being transferred and may be used to identify a current location of the data within the heterogeneously partitioned table. Additionally, the scheduler may determine when data overlap occurs, and may insert one or more filters to avoid duplicate counting.

In addition, as shown in FIG. 4, method 400 may proceed with operation 406, where an access method associated with each of the one or more partitions is determined. In one embodiment, the access method(s) may be determined by the scheduler of the system. In another embodiment, the access method may include a method by which data is accessed within each of the one or more partitions.

Also, in one embodiment, the access method(s) may be determined by identifying a description of each of the one or more partitions. For example, metadata describing each of the one or more partitions may be stored within a predetermined location within the system (e.g., a hive metastore, etc.). In another example, the metadata describing each partition may include one or more of a location of the partition, a type of hardware of the partition, a storage format used by the partition, a data type used by the partition, etc.

Also, in one embodiment, the description of each of the one or more partitions may be used to determine the access method for each of the one or more partitions. For example, for each of the one or more partitions, the description of the partition may be used to identify a method by which data is accessed within the partition.

Further still, as shown in FIG. 4, method 400 may proceed with operation 408, where the data is requested from the one or more partitions, utilizing the access method associated with each of the one or more partitions. In one embodiment, the data may be requested utilizing the scheduler of the system. In another embodiment, requesting the data from the one or more partitions may include creating an execution unit (e.g., a thread, a process, etc.) for each of the one or more partitions. For example, a plurality of execution units (e.g., threads, etc.) may be made in parallel for a plurality of partitions, with one thread being assigned to each partition. In another example, multiple processors, threads, and/or machines may be used to implement the plurality of execution units.

Further, in one embodiment, requesting the data from the one or more partitions may include implementing an access action on each execution unit. For example, requesting the data from the one or more partitions may include instantiating a sub-operator on each execution unit, where each sub-operator utilizes the access method associated with the partition to which the execution unit is assigned.

In one example, a first portion of the requested data may be located on a first partition of the heterogeneously partitioned table, and a second portion of the requested data may be located on a second partition of the heterogeneously partitioned table. The scheduler may create a first thread for the first partition and a second thread for the second partition. The scheduler may then instantiate a sub-operator on the first thread for the first partition, where the sub-operator requests the first portion of the requested data on the first partition utilizing the access method associated with the first partition. The scheduler may also instantiate a sub-operator on the second thread for the second partition, where the sub-operator requests the second portion of the requested data on the second partition utilizing the access method associated with the second partition.

Further still, in one embodiment, the requested data may be returned from the one or more partitions, in response to the one or more requests. For example, each data partition may return the data requested from that partition.

In this way, a plurality of different data storage locations that have different characteristics such as hardware and storage formats may be viewed as generic partitions within a single heterogeneously partitioned table. A single query for data may then be addressed to the single heterogeneously partitioned table, and specific access details for each of the specific data storage locations may be implemented behind a level of abstraction. Compilers and optimizers may only see the single heterogeneously partitioned table and may plan the execution of the query according to that single table, which may simplify query implementation. This may simplify query compilation and optimization.

Figure 5:
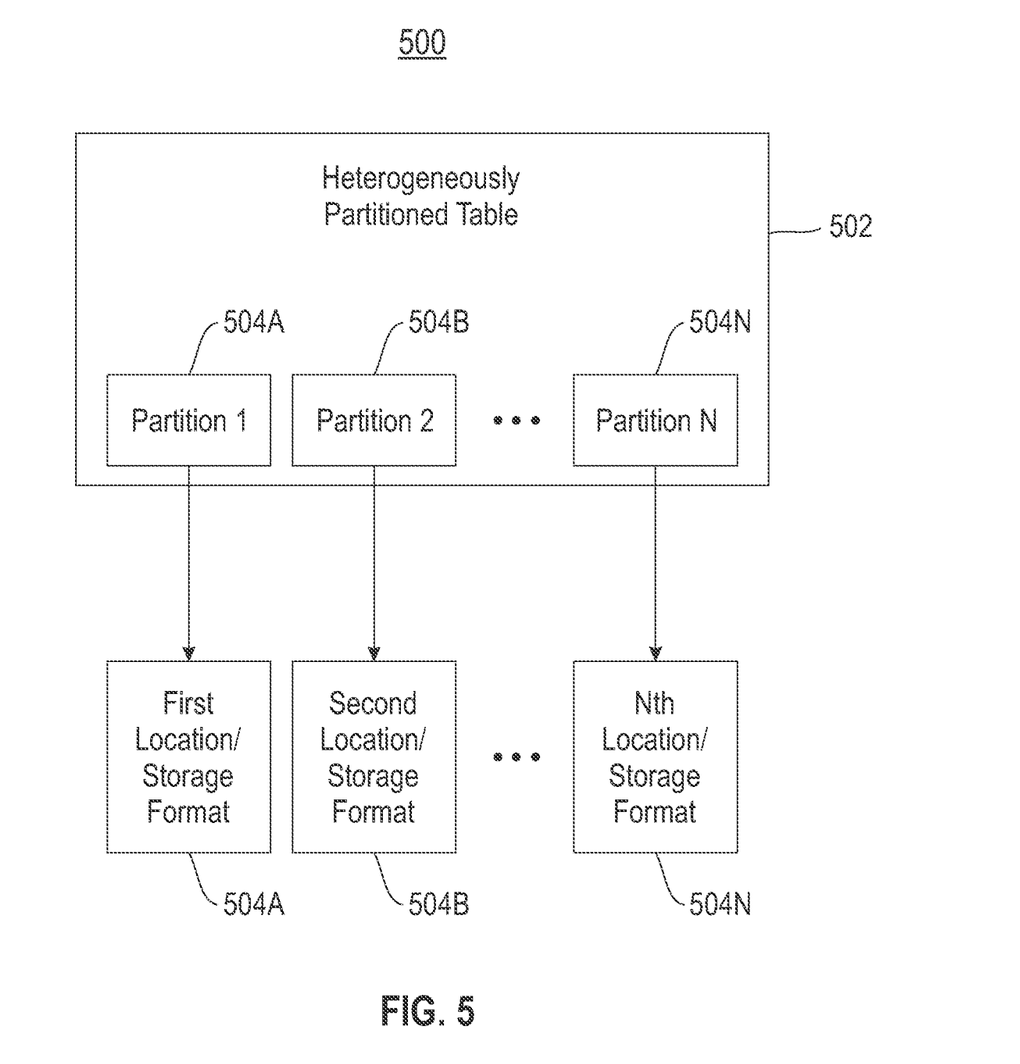
FIG. 5 illustrates a representation of a heterogeneously partitioned table, in accordance with one embodiment.

Now referring to FIG. 5, a representation 500 of a heterogeneously partitioned table is illustrated, according to one embodiment. As shown, the heterogeneously partitioned table 502 includes a plurality of partitions 504A-N. These partitions 504A-N may be viewed as uniform partitions within a single table. However, the plurality of partitions 504A-N are representative of unique data storage locations 506A-N, each having an associated storage format. In one embodiment, each of the unique data storage locations 506A-N may have a different storage format, a different hardware configuration, etc.

As a result, requests for data directed at the heterogeneously partitioned table 502 may include a single query that does not account for differences between the storage formats, storage systems, hardware configurations, etc. in the unique data storage locations 506A-N. Further, a compiler of the single query may see only the abstract partitions 504A-N of the heterogeneously partitioned table 502 and may be unaware of the unique data storage locations 506A-N. Therefore, a unified view of data that conforms to a single schema may be implemented, while supporting specific formats required by different data storage systems.

Figure 6:
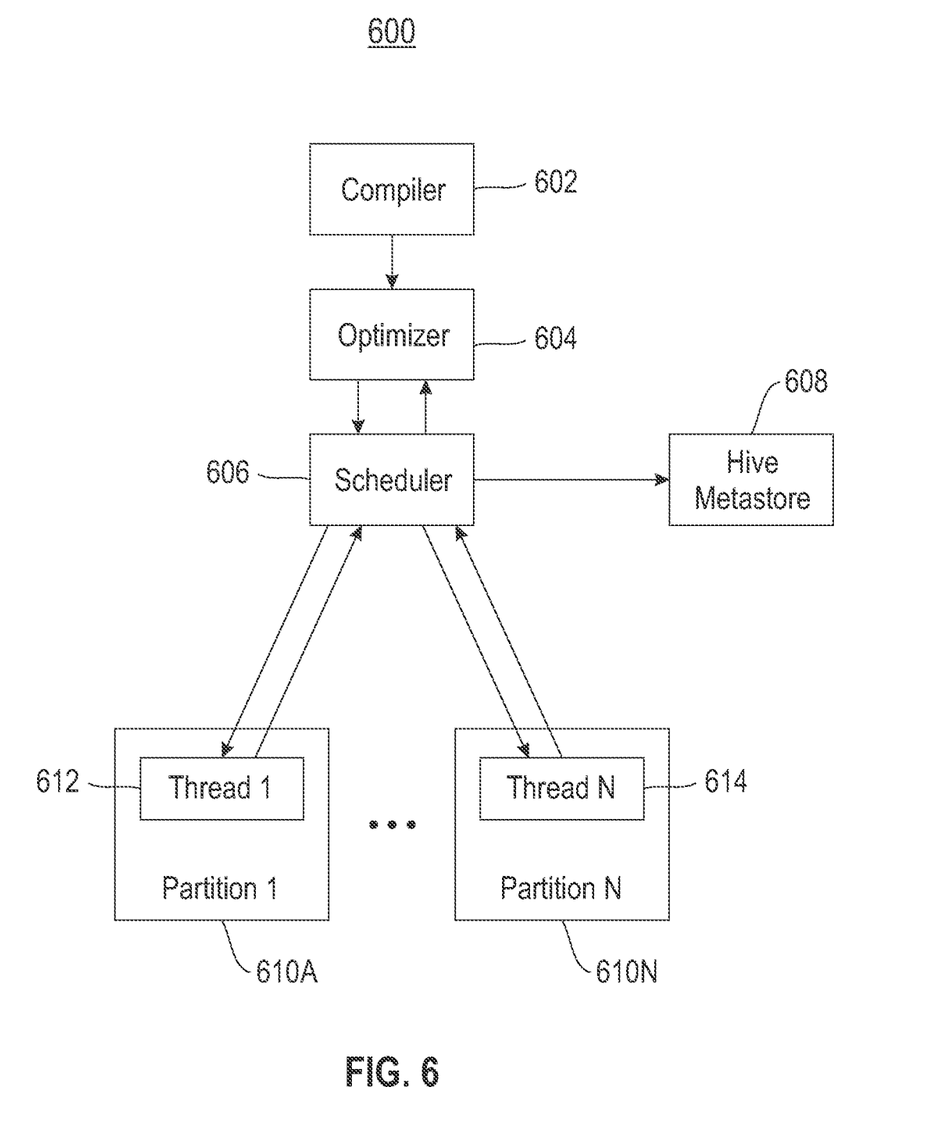
FIG. 6 illustrates an exemplary heterogeneously partitioned table architecture having partitions with different access methods, in accordance with one embodiment.

Now referring to FIG. 6, an exemplary heterogeneously partitioned table architecture 600 having partitions 610A-N with different access methods is shown, according to one embodiment. As shown, the architecture 600 includes a compiler 602 in communication with an optimizer 604. The compiler 602 may compile received data requests, and the optimizer 604 may create an operator for the single heterogeneously partitioned table based on the compiled request.

Additionally, the optimizer 604 is in communication with a scheduler 606. The scheduler 606 is used to execute the request for data. A metadata server may contain information about data partitions, including storage locations, formats, data ranges, etc. In one embodiment of this invention a hive metastore 608 is in communication with the scheduler 606 and stores a storage format for each partition 610A-N within the heterogeneously partitioned table.

In one embodiment, the compiler 602 may receive a request for data. For example, the compiler 602 may receive an SQL query from a user or an application, where the SQL query includes a read request for data that is stored within the heterogeneously partitioned table. In another embodiment, the compiler 602 may compile the request and send the compiled request to the optimizer 604. Utilizing the compiled request, the optimizer may then create an operator for the heterogeneously partitioned table. For example, the optimizer 604 may create a single Scan operator.

Further, the optimizer 604 may then send the operator created from the request for data to the scheduler 606 for run-time execution. The scheduler 606 may then determine that a first portion of the requested data is located at a first partition 610A within the heterogeneously partitioned table and a second portion of the requested data is located at an Nth partition 610N within the heterogeneously partitioned table. Further still, the scheduler 606 may then retrieve the storage format of the first partition 610A and the Nth partition 610N from the hive metastore 608. For example, the storage format of the first partition 610A may be different from the storage format of the Nth partition 610N.

Also, utilizing the storage format of the first partition 610A, the scheduler 606 may determine a first access method necessary to request the first portion of the requested data from the first partition 610A. Utilizing the storage format of the Nth partition 610N, the scheduler 606 may determine a second access method necessary to request the second portion of the requested data from the Nth partition 610N.

In addition, the scheduler 606 may then create a first thread 612 that requests data from the first partition 610A, utilizing the first access method. The scheduler 606 may also create a second thread 614 that requests data from the Nth partition 610N, utilizing the second access method. The first partition 610A and the Nth partition may then return the requested data.

In this way, a single SQL query may be sent for data that is stored on two or more different data locations each having a different data access method. The different data locations and access methods may be abstractly represented, such that they are hidden from the compiler 602 and optimizer 604 (which may view the locations as generic partitions of a table).

Figure 7:
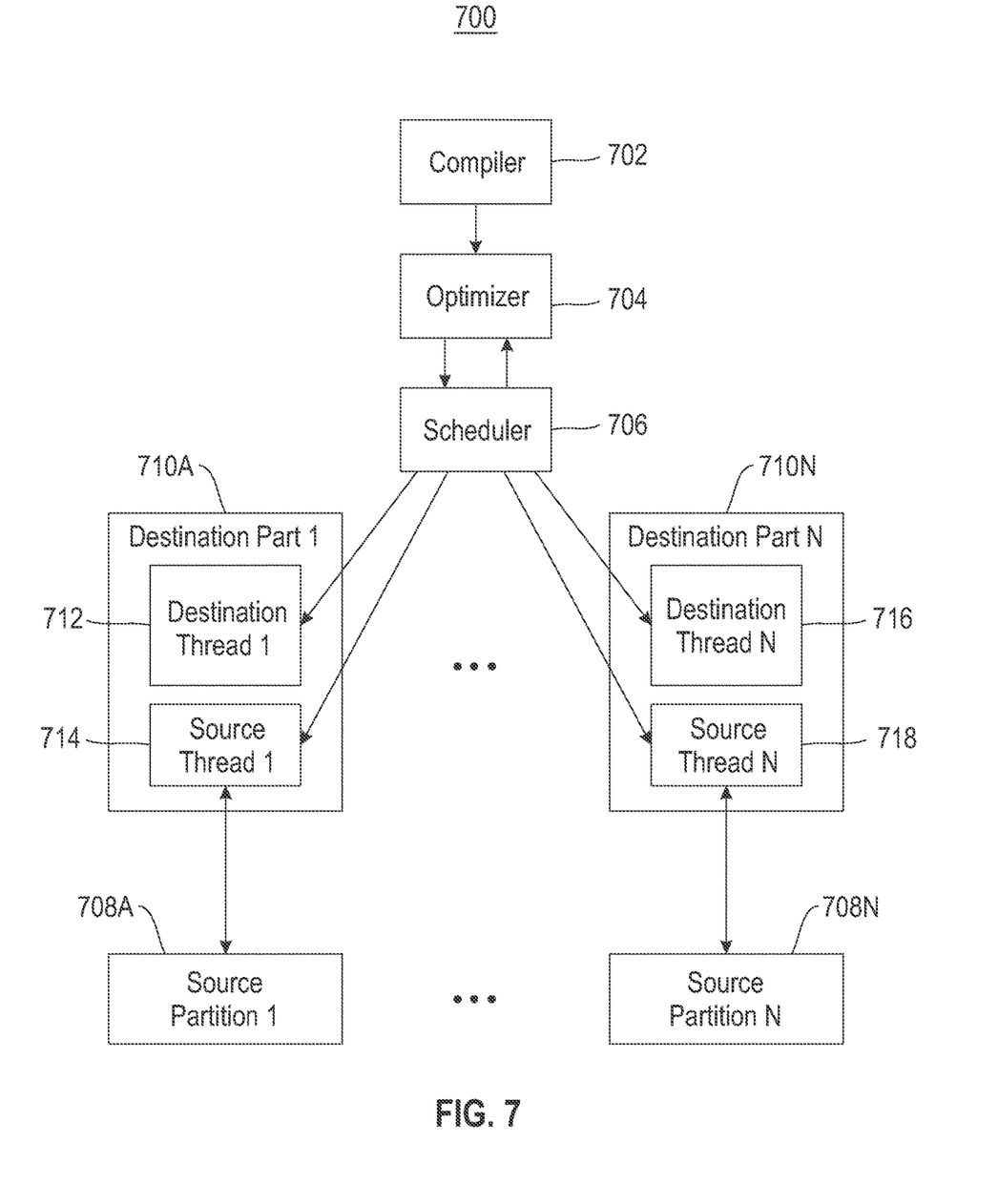
FIG. 7 illustrates an exemplary heterogeneously partitioned table architecture during a data migration, in accordance with one embodiment.

Now referring to FIG. 7, an exemplary heterogeneously partitioned table architecture 700 during a data migration is shown, according to one embodiment. As shown, the architecture 700 includes a compiler 702 in communication with an optimizer 704. As in FIG. 6, the compiler 702 may compile received data requests, and the optimizer 704 may create an operator for the heterogeneously partitioned table based on the compiled request. Also as in FIG. 6, the optimizer 704 is in communication with a scheduler 706, where the scheduler 706 is used to execute the request for data.

Additionally, data migration is occurring between source partitions 708A-N and destination partitions 710A-N. For example, the source partitions 708A-N may include one or more data warehouse locations, and the destination partitions 710A-N may include one or more HDFS file systems. The source partitions 708A-N and the destination partitions 710A-N may be included within a single heterogeneously partitioned table.

In one embodiment, the compiler 702 may receive a request for data. In another embodiment, the compiler 702 may compile the request and send the compiled request to the optimizer 704. Utilizing the compiled request, the optimizer may then create an operator for the heterogeneously partitioned table. Further, the optimizer 704 may then send the operator created from the request for data to the scheduler 706 for run-time execution.

In another embodiment, the scheduler 706 may determine that the requested data was originally located at the source partitions 708A and 708N but is currently being migrated to the destination partitions 710A and 710N within the heterogeneously partitioned table. The scheduler 706 may make this determination by monitoring the flow of data within the heterogeneously partitioned table. As data is migrated between partitions, metadata about partitions may be updated to reflect the change, and to keep track of data ranges in each partition.

In response to this determination, the scheduler 706 may first identify access methods necessary to request data from both the source partitions 708A and 708N as well as the destination partitions 710A and 710N. For example, these access methods may be retrieved from a hive metastore. The scheduler 706 may then make a runtime identification of the location of the requested data. For example, the scheduler 706 may obtain and utilize timestamp data produced during the migration to determine a current location of the requested data. This timestamp data may be used to determined what portions of the requested data are currently located within each of the source partitions 708A and 708N as well as the destination partitions 710A and 710N. It may be possible that the same data is available from both source partitions 708A and 708N for a period of time, which may allow overlap between partitions.

Further, the scheduler 706 may then create a first thread 712 that requests data from the first destination partition 710A, utilizing the appropriate access method for the first destination partition 710A, and including additional filter conditions to the access method to read each data item only once.

In this way, a single SQL query may be sent for data that is currently being migrated between different data locations. This migration may be hidden from the compiler 702 and optimizer 704. Data retrieval during this migration may be implemented by a scheduler performing state-full analysis during runtime. Additionally, data overlap may be addressed utilizing one or more of watermarking and filtering.

Figure 8:
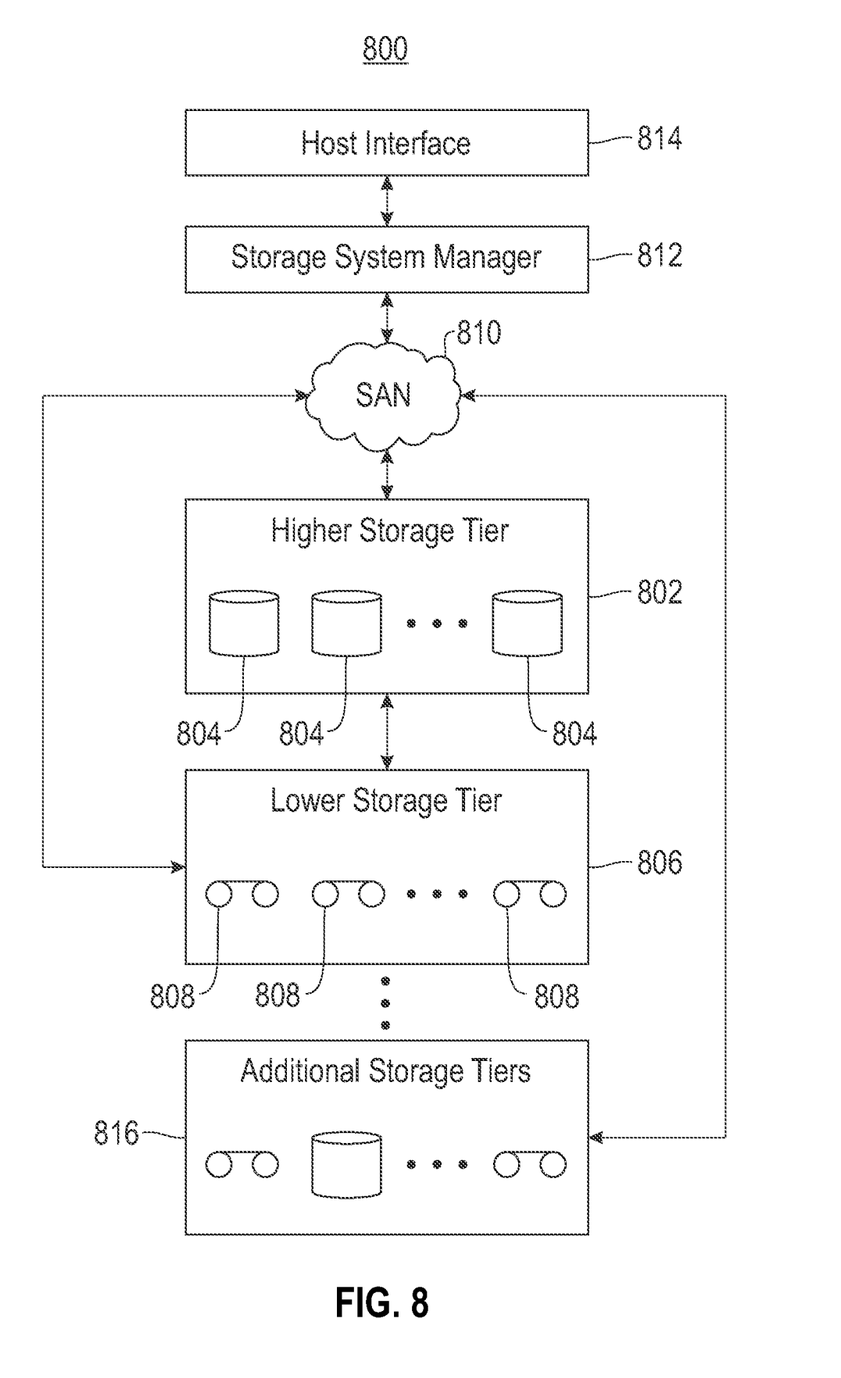
FIG. 8 illustrates a tiered data storage system in accordance with one embodiment.

Now referring to FIG. 8, a storage system 800 is shown according to one embodiment. Note that some of the elements shown in FIG. 8 may be implemented as hardware and/or software, according to various embodiments. The storage system 800 may include a storage system manager 812 for communicating with a plurality of media on at least one higher storage tier 802 and at least one lower storage tier 806. The higher storage tier(s) 802 preferably may include one or more random access and/or direct access media 804, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 806 may preferably include one or more lower performing storage media 808, including sequential access media such as magnetic tape in tape drives and/or optical media, slower accessing HDDs, slower accessing SSDs, etc., and/or others noted herein or known in the art. One or more additional storage tiers 816 may include any combination of storage memory media as desired by a designer of the system 800. Also, any of the higher storage tiers 802 and/or the lower storage tiers 806 may include some combination of storage devices and/or storage media.

The storage system manager 812 may communicate with the storage media 804, 808 on the higher storage tier(s) 802 and lower storage tier(s) 806 through a network 810, such as a storage area network (SAN), as shown in FIG. 8, or some other suitable network type. The storage system manager 812 may also communicate with one or more host systems (not shown) through a host interface 814, which may or may not be a part of the storage system manager 812. The storage system manager 812 and/or any other component of the storage system 800 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 800 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 802, may include a majority of SSD storage media for storing data in a higher performing storage environment, and remaining storage tiers, including lower storage tier 806 and additional storage tiers 816 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 802, while data not having one of these attributes may be stored to the additional storage tiers 816, including lower storage tier 806. Of course, one of skill in the art, upon reading the present descriptions, may devise many other combinations of storage media types to implement into different storage schemes, according to the embodiments presented herein.

According to some embodiments, the storage system (such as 800) may include logic configured to receive a request to open a data set, logic configured to determine if the requested data set is stored to a lower storage tier 806 of a tiered data storage system 800 in multiple associated portions, logic configured to move each associated portion of the requested data set to a higher storage tier 802 of the tiered data storage system 800, and logic configured to assemble the requested data set on the higher storage tier 802 of the tiered data storage system 800 from the associated portions.

Of course, this logic may be implemented as a method on any device and/or system or as a computer program product, according to various embodiments.

Figure 9:
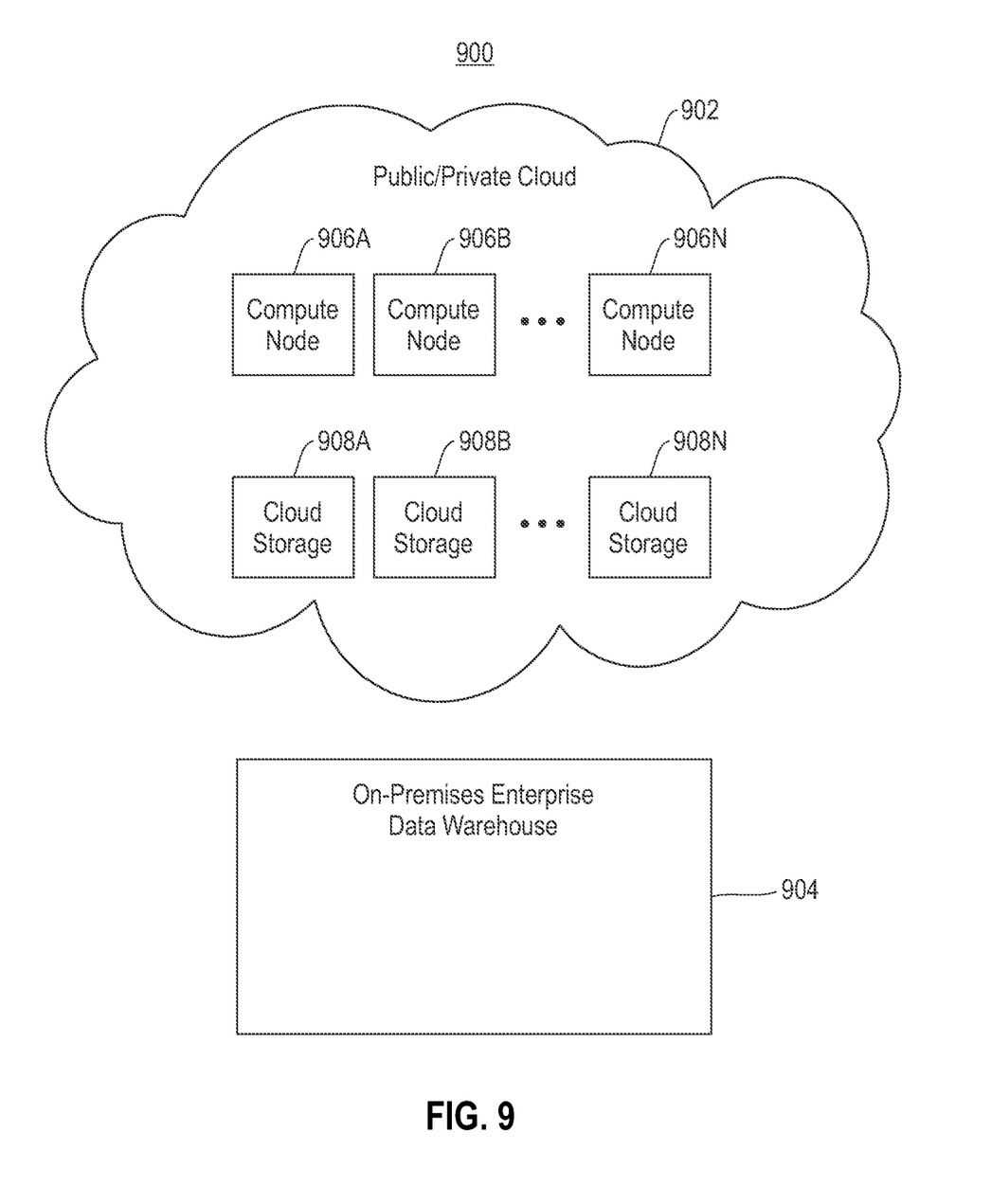
FIG. 9 illustrates an example of a hybrid environment including a public/private cloud and an on-premises data warehouse.

FIG. 9 illustrates an example of a hybrid environment 900 including a public/private cloud 902 and an on-premises data warehouse 904. As shown, the public/private cloud 902 includes a plurality of compute nodes 906A-N and a plurality of cloud storage nodes 908A-N. In one embodiment, the plurality of cloud storage nodes 908A-N may include one or more Hadoop™ distributed file system (HDFS) clusters, one or more object stores, etc. In another embodiment, the public/private cloud 902 may work together with the on-premises data warehouse 904 (e.g., to enable data storage and retrieval, etc.).

Additionally, in one embodiment, the on-premises data warehouse 904 may include one or more on-site repositories for data from one or more separate sources. In another embodiment, the public/private cloud 902 may include hardware such as one or more solid state drives (SSDs), flash memory drives, non-volatile random access memory (NVRAM), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving a single request to read data;
locating the data requested by the single request at both a first partition and a second partition of a heterogeneously partitioned table, where the first partition represents a first storage location that utilizes a column organized storage format to store data, and the second partition represents a second storage location that utilizes a row organized storage format to store data, and the data is currently being transferred from one partition to another partition within the heterogeneously partitioned table;
determining a first access method associated with the first partition, based on a description of the first partition including a storage format used by the first partition, a location of the first partition, a type of hardware of the first partition, and a data type used by the first partition, where the description of the first partition is stored as first metadata within a predetermined location;
determining a second access method associated with the second partition, based on a description of the second partition including a storage format used by the second partition, a location of the second partition, a type of hardware of the second partition, and a data type used by the second partition, where the description of the second partition is stored as second metadata within the predetermined location, where the second access method is different from the first access method; and
requesting the data from the first partition and the second partition, utilizing the first access method and the second access method, including:
creating, in parallel, a first thread for the first partition and a second thread for the second partition,
instantiating a first sub-operator on the first thread for the first partition, where the first sub-operator requests a first portion of the data on the first partition utilizing the first access method, and
instantiating a second sub-operator on the second thread for the second partition, where the second sub-operator requests a second portion of the data on the second partition utilizing the second access method.

2. The computer-implemented method of claim 1, wherein the data is stored in a combination of storage mediums and object-stores.

3. The computer-implemented method of claim 1, wherein the first storage location is different from the second storage location.

4. The computer-implemented method of claim 1, wherein the first storage location is cloud-based, and the second storage location is on-premises enterprise-based.

5. The computer-implemented method of claim 1, further comprising determining when data overlap occurs, and inserting one or more filters to avoid duplicate counting.

6. The computer-implemented method of claim 1, further comprising identifying and eliminating one or more additional partitions of the heterogeneously partitioned table that are not needed in response to the single request.

7. The computer-implemented method of claim 1, wherein:
during the transfer, a location of the data being transferred is tracked by identifying one or more timestamps for the data being transferred, and using the one or more timestamps to identify a current location of the data within the heterogeneously partitioned table.

8. The computer-implemented method of claim 1, further comprising determining when data overlap occurs, and inserting one or more filters to avoid duplicate counting, wherein:
the first storage location is cloud-based, and the second storage location is on-premises enterprise-based.

9. A computer program product for accessing tables with heterogeneous partitions, the computer program product comprising a computer readable storage medium having program instructions embodied therewith, wherein the computer readable storage medium is not a transitory signal per se, the program instructions executable by a processor to cause the processor to perform a method comprising:
receiving a single request to read data, utilizing the processor;
locating the data requested by the single request at both a first partition and a second partition of a heterogeneously partitioned table, utilizing the processor, where the first partition represents a first storage location that utilizes a column organized storage format to store data, and the second partition represents a second storage location that utilizes a row organized storage format to store data, and the data is currently being transferred from one partition to another partition within the heterogeneously partitioned table;
determining, utilizing the processor, a first access method associated with the first partition, based on a description of the first partition including a storage format used by the first partition, a location of the first partition, a type of hardware of the first partition, and a data type used by the first partition, where the description of the first partition is stored as first metadata within a predetermined location;
determining, utilizing the processor, a second access method associated with the second partition, based on a description of the second partition including a storage format used by the second partition, a location of the second partition, a type of hardware of the second partition, and a data type used by the second partition, where the description of the second partition is stored as second metadata within the predetermined location, where the second access method is different from the first access method; and
requesting, utilizing the processor, the data from the first partition and the second partition, utilizing the first access method and the second access method, including:
creating, in parallel, a first thread for the first partition and a second thread for the second partition,
instantiating a first sub-operator on the first thread for the first partition, where the first sub-operator requests a first portion of the data on the first partition utilizing the first access method, and
instantiating a second sub-operator on the second thread for the second partition, where the second sub-operator requests a second portion of the data on the second partition utilizing the second access method.

10. The computer program product of claim 9, wherein the data is stored in a combination of storage mediums and object-stores.

11. The computer program product of claim 9, wherein the first storage location is different from the second storage location.

12. The computer program product of claim 9, wherein the first storage location is cloud-based, and the second storage location is on-premises enterprise-based.

13. A system, comprising:
a processor; and
logic integrated with the processor, executable by the processor, or integrated with and executable by the processor, the logic being configured to:
receive a single request to read data;
locate the data requested by the single request at both a first partition and a second partition of a heterogeneously partitioned table, where the first partition represents a first storage location that utilizes a column organized storage format to store data, and the second partition represents a second storage location that utilizes a row organized storage format to store data, and the data is currently being transferred from one partition to another partition within the heterogeneously partitioned table;
determine a first access method associated with the first partition, based on a description of the first partition including a storage format used by the first partition, a location of the first partition, a type of hardware of the first partition, and a data type used by the first partition, where the description of the first partition is stored as first metadata within a predetermined location;
determine a second access method associated with the second partition, based on a description of the second partition including a storage format used by the second partition, a location of the second partition, a type of hardware of the second partition, and a data type used by the second partition, where the description of the second partition is stored as second metadata within the predetermined location, where the second access method is different from the first access method; and
request the data from the first partition and the second partition, utilizing the first access method and the second access method, including:
creating, in parallel, a first thread for the first partition and a second thread for the second partition,
instantiating a first sub-operator on the first thread for the first partition, where the first sub-operator requests a first portion of the data on the first partition utilizing the first access method, and
instantiating a second sub-operator on the second thread for the second partition, where the second sub-operator requests a second portion of the data on the second partition utilizing the second access method.

* * * * *